US009715684B2

(12) United States Patent
Kobres

(10) Patent No.: US 9,715,684 B2
(45) Date of Patent: Jul. 25, 2017

(54) METHOD AND APPARATUS FOR DETECTING MISIDENTIFICATION OF ITEMS SOLD BY WEIGHT

(71) Applicant: Erick Christian Kobres, Lawrenceville, GA (US)

(72) Inventor: Erick Christian Kobres, Lawrenceville, GA (US)

(73) Assignee: NCR Corporation, Duluth, GA (US)

(*) Notice: Subject to any disclaimer, the term of this patent is extended or adjusted under 35 U.S.C. 154(b) by 154 days.

(21) Appl. No.: 13/955,855

(22) Filed: Jul. 31, 2013

(65) Prior Publication Data

US 2015/0039456 A1    Feb. 5, 2015

(51) Int. Cl.
*G06Q 20/20*    (2012.01)
*G06Q 20/40*    (2012.01)
*G07G 1/00*    (2006.01)

(52) U.S. Cl.
CPC .......... *G06Q 20/208* (2013.01); *G06Q 20/20* (2013.01); *G06Q 20/4016* (2013.01); *G07G 1/0072* (2013.01)

(58) Field of Classification Search
CPC ............................. G06Q 20/208; G06Q 20/20
USPC ...................................... 705/23, 16
See application file for complete search history.

(56) References Cited

U.S. PATENT DOCUMENTS

| | | | | |
|---|---|---|---|---|
| 5,952,642 | A | * | 9/1999 | Lutz ............................. 235/383 |
| 6,032,128 | A | * | 2/2000 | Morrison et al. ............... 705/23 |
| 2003/0001007 | A1 | * | 1/2003 | Lee et al. ...................... 235/383 |
| 2003/0047387 | A1 | * | 3/2003 | Bogat ............................. 186/59 |
| 2009/0060259 | A1 | * | 3/2009 | Goncalves .................... 382/100 |

* cited by examiner

*Primary Examiner* — Ramsey Refai
(74) *Attorney, Agent, or Firm* — Harden E. Stevens, III; Schwegman, Lundberg & Woessner

(57) ABSTRACT

A point of sale terminal that performs purchase transactions is presented. The point of sale terminal includes an optical code scanner and weigh scale device. The optical code scanner portion of the optical code scanner and weigh scale device continuously scans for an optical code while the weigh scale portion of the optical code scanner and weigh scale device weighs an item placed on the scale. When the point of sale terminal receives data for an optical code that is read during the time an item is being weighed, the point of sale terminal compares information from the optical code data to the identification data entered by an operator for the item being weighed. If the item information does not match, the point of sale terminal halts the current purchase transaction until a supervisor intervenes.

20 Claims, 5 Drawing Sheets

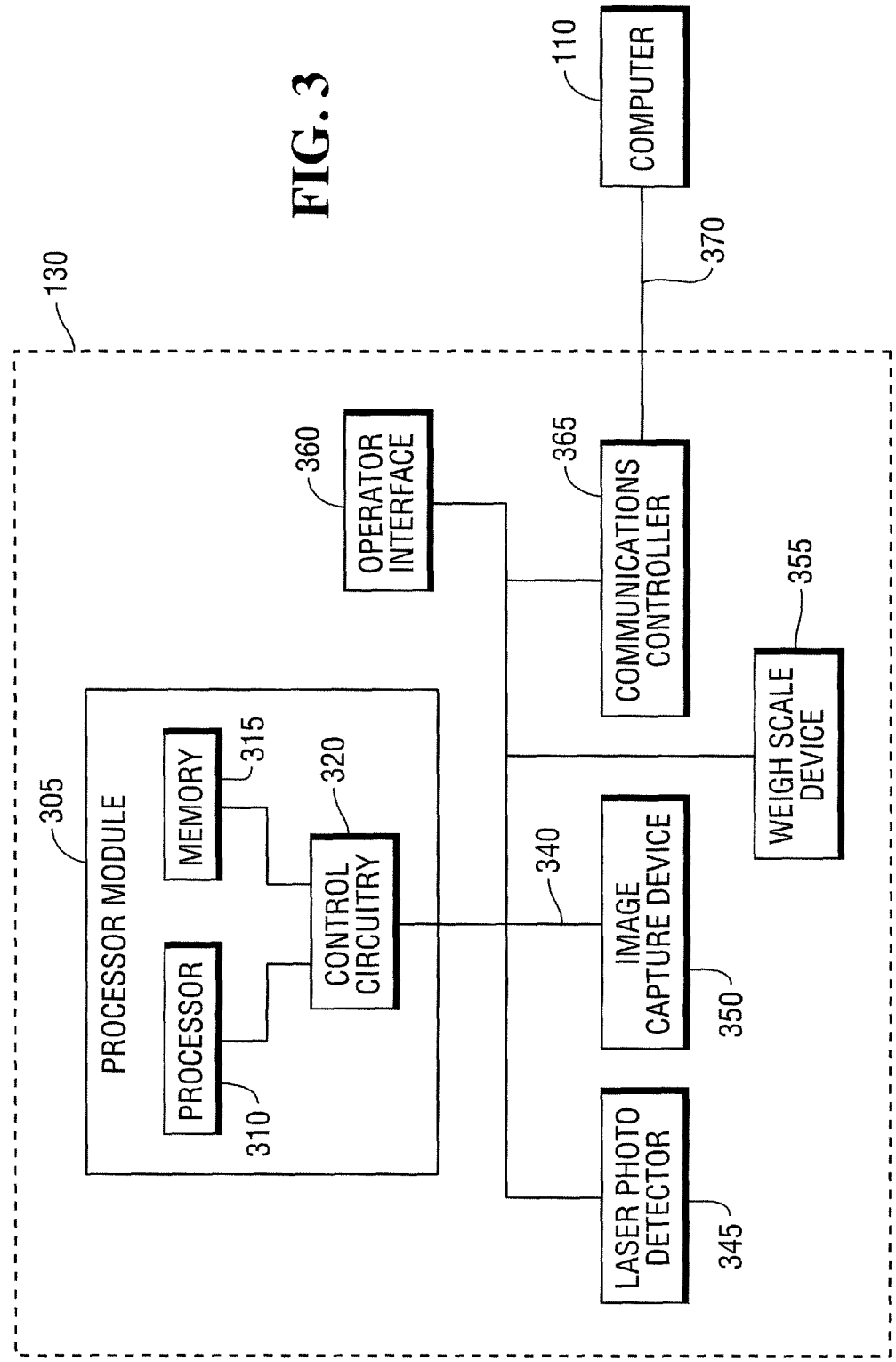

METHOD AND APPARATUS FOR DETECTING MISIDENTIFICATION OF ITEMS SOLD BY WEIGHT

FIELD OF THE INVENTION

The present invention relates to point of sale terminals with an optical code scanner and weigh scale device and more specifically to preventing fraud at the point of sale terminal on items that are sold by weight where the weight is determined at the time of a purchase.

BACKGROUND

Point of sale terminals identify items presented for purchase as part of a purchase transaction. A point of sale terminal may suitably use an optical code scanner and weigh scale device to read optical codes on items presented to the terminal for identification and to weigh items that are sold by weight where the weight is determined at the time of purchase.

A frequent fraud that occurs at a point of sale terminal involves identifying an expensive item sold by optical code identification as an inexpensive item sold by weight. This fraud is sometimes called the "Bananas and Bourbon" fraud. The fraud works by placing an expensive item, such as a bottle of bourbon, on the weigh scale of the point of sale terminal. The optical code scanner and weigh scale device senses the presence of the item and starts an item weighing cycle. During the item weighing cycle, optical code identification is disabled. The weigh scale determines a stable weight for the item and sends the stable weight to the point of sale terminal. The point of sale terminal requests that an operator input an identity for the item on the scale. The operator then enters a code that identifies an inexpensive item, such as bananas. The point of sale terminal then calculates the price using the weight of the expensive item and a price per unit weight associated with the inexpensive item identified by the operator. The calculated price is less than the actual price of the expensive item plus the expensive item has been misidentified to the point of sale terminal. This type of fraud not only allows for an expensive item to be sold at a lower price, but may also allow age restricted items to be sold to under age customers.

SUMMARY

Among its several aspects, the present invention seeks to overcome or ameliorate at least one of the disadvantages of the prior art, or to provide a useful alternative.

Among its several aspects, the present invention recognizes there is an advantage to using two different methods to identify an item sold by weight that is placed on a weigh scale of an optical code scanner and weigh scale device to determine the item's weight. Using two independent methods for identification reduces the opportunity for someone to commit fraud by identifying an expensive item as an inexpensive item.

In accordance with the teachings of the present invention, an optical code scanner and weigh scale device is provided for scanning optical codes and for determining the weight of an item placed on a weigh plate of the weigh scale. When an item is placed on the weigh plate, a weighing process begins for weighing the item. The weighing process involves waiting for the item and the moving parts of the weigh scale to stop moving and then determining the weight of the item. The determined weight is then transmitted to a point of sale terminal. The weighing process ends when the item is removed from the weigh plate. During the weighing process, the optical code scanner portion of the optical code scanner and weigh scale device continues active scanning for optical codes. If the item being weighed has an optical code that is visible to the optical code scanner, the optical code scanner will read the optical code and transmit the information to the point of sale terminal.

In one embodiment of the present invention, an item is placed on the weigh plate and the weigh scale portion determines the weight of the item and the optical code scanner and weigh scale device transmits the weight of the item to the point of sale terminal. While the item is still placed on the weigh plate, an optical code is scanned by the optical code scanner portion and the optical code scanner and weigh scale device transmits data for the read optical code to the point of sale terminal. The point of sale terminal instructs an operator to enter a code that identifies the item on the weigh plate. The point of sale terminal receives an item identification code from the operator and compares it to the optical code data received from the optical code scanner and weigh scale device. If the data from the two sources identify the same item, the point of sale terminal continues to process the item by adding the item to a purchase transaction. If the data from the two sources do not identify the same item, the point of sale terminal sends a request for assistance to a supervisor. The operator can be either a cashier or a customer that is operating the point of sale terminal. The point of sale terminal will not complete the purchase transaction until a supervisor reviews the identity of the item and inputs information identifying the item and authorization to complete the purchase transaction. By continuing the purchase transaction, it will be difficult for the causal thief to determine how the point of sale terminal identified the fraud.

In another embodiment of the present invention, an item is placed on the weigh plate and the weigh scale portion determines the weight of the item and the optical code scanner and weigh scale device transmits the weight of the item to the point of sale terminal. While the item is still placed on the weigh plate, an optical code is scanned by the optical code scanner portion and the optical code scanner and weigh scale device transmits data for the read optical code to the point of sale terminal. The point of sale terminal displays on an operator display information identifying the item on the weigh plate based on the optical code data and requests that the operator confirm that the identification of the item is correct. If the operator confirms the identity of the item, the point of sale terminal determines the price of the item and adds the item to the purchase transaction. If the operator does not confirm the identity of the item, the point of sale terminal sends a request for assistance to a supervisor. The operator can be either a cashier or a customer that is operating the point of sale terminal.

In accordance with an embodiment of the present invention, there is provided a computer implemented method for processing a purchase transaction performed by a point of sale terminal. The method comprises: receiving stable weight data from the optical code scanner and weigh scale device wherein the stable weight data includes a stable weight for a first sold by weight item placed on the weigh scale portion of the optical code scanner and weigh scale device; receiving first optical code data for a first item from the optical code scanner and weigh scale device while the first sold by weight item is still on the weigh scale wherein the first optical code data includes information identifying a first optical code that is located on the first sold by weight item; receiving from an operator input device a first code identifying the first sold by weight item resting on the weigh scale portion of the optical code scanner and weigh scale device; continuing the purchase transaction when the identity of the first item as determined by the first optical code data matches the identity of the first sold by weight item as determined by the first code; and requesting assistance from a supervisor when the identity of the first item as determined by the first optical code data fails to match the identity of the first sold by weight item as determined by the first code.

In accordance with another embodiment of the present invention, there is provided a computer implemented method for processing a purchase transaction performed by a point of sale terminal. The method comprises: receiving stable weight data from the optical code scanner and weigh scale device wherein the stable weight data includes a stable weight for a first sold by weight item placed on the weigh scale portion of the optical code scanner and weigh scale device; receiving first optical code data from the optical code scanner and weigh scale device while the first sold by weight item is still on the weigh scale wherein the first optical code data includes information identifying a first optical code that is located on the first sold by weight item; determining the identity of a first item using the second optical code data; displaying on an operator display device information identifying the first item and requesting confirmation that this information identifies the first sold by weight item; receiving from an operator input device a response to the confirmation request; continuing the purchase transaction when the received response confirms the identity of the first sold by weight item; and requesting assistance from a supervisor when the received response fails to confirm the identity of the first sold by weight item.

A more complete understanding of the present invention, as well as further features and advantages of the invention, will be apparent from the following Detailed Description and the accompanying Drawings.

BRIEF DESCRIPTION OF THE DRAWINGS

The present invention may take form in various components and arrangement of components and in various methods. The drawings are only for purposes of illustrating example embodiments and alternatives and are not to be construed as limiting the invention. The drawings are not necessarily drawn to scale. Throughout the drawings, like element numbers are used to describe the same parts throughout the various drawings, figures and charts.

FIG. 3 is a high-level block diagram illustrating selected hardware components of the optical code scanner and weigh scale device.

DETAILED DESCRIPTION

In the following description, numerous details are set forth to provide an understanding of the claimed invention. However, it will be understood by those skilled in the art that aspects of the claimed invention may be practiced without utilizing all of these details and that numerous variations or modifications from the described embodiments are possible and envisioned.

Figure 1:
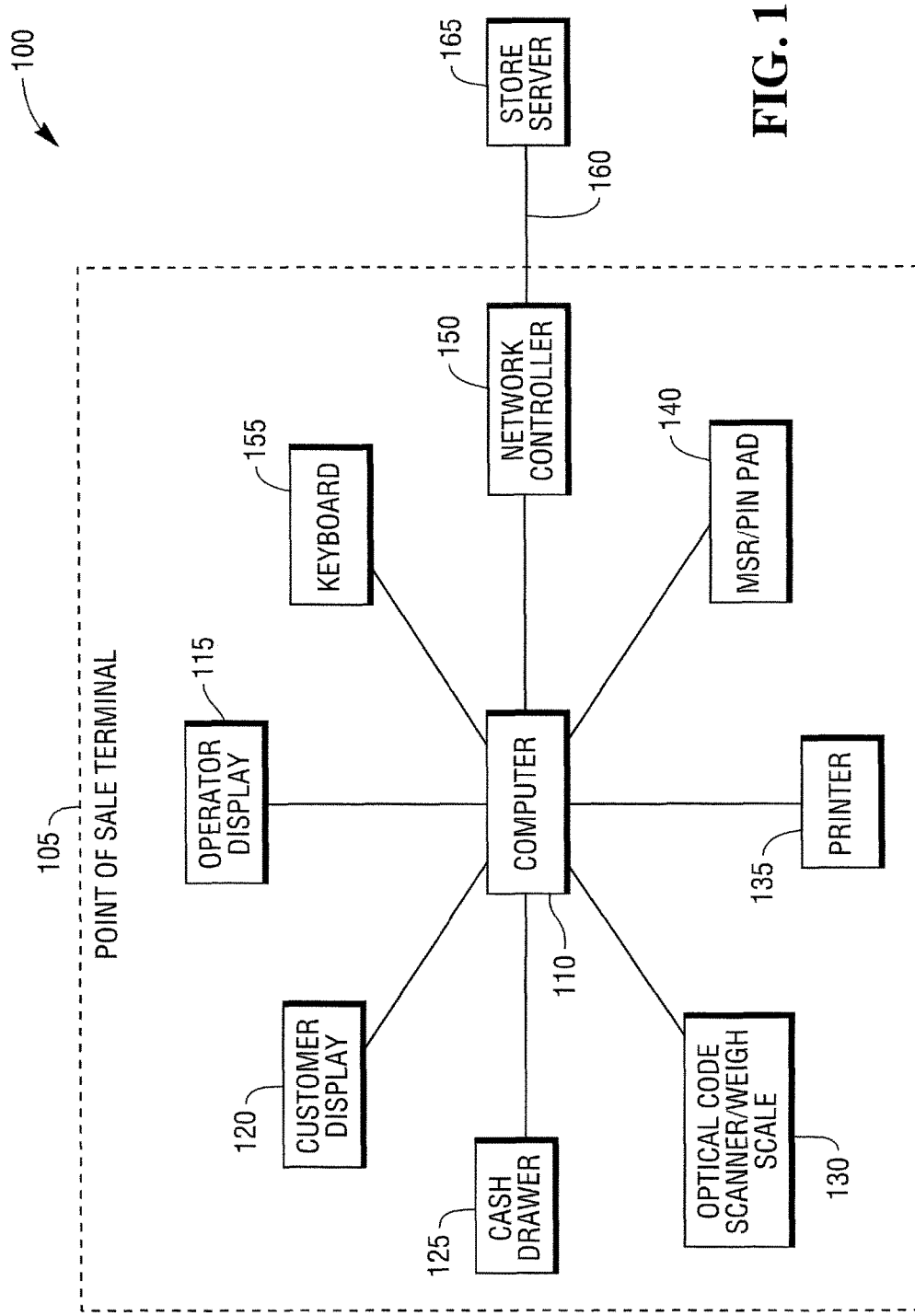
FIG. 1 is a high-level block diagram illustrating a retail point of sale system of the present invention.

With reference to FIG. 1, there is provided a high-level block diagram illustrating a point of sale system 100 including a point of sale (POS) terminal 105 that uses a network 160 to communicate with a store server computer 165. The point of sale system 100 may suitably include more than one POS terminal 105 where each POS terminal 105 communicates over the network 160 with the store server computer 165. The POS terminal 105 may be implemented as either an assisted POS terminal or a customer operated POS terminal which is sometimes referred to as a self-service POS terminal.

In this embodiment, the POS terminal 105 includes a computer 110 that implements the features and controls the components and peripherals that are part of or attached to the POS terminal 105. The POS terminal 105 further includes an operator display 115, a customer display 120, a cash drawer 125, an optical code scanner/weigh scale device 130, a printer 135, a magnetic stripe reader (MSR) and personal identification number (PIN) pad 140, a network controller 150 and a keyboard 155. In customer operated embodiments, the customer display 120 is not included in the POS terminals 105 and the operator display 115 performs all the display functions.

Figure 2:
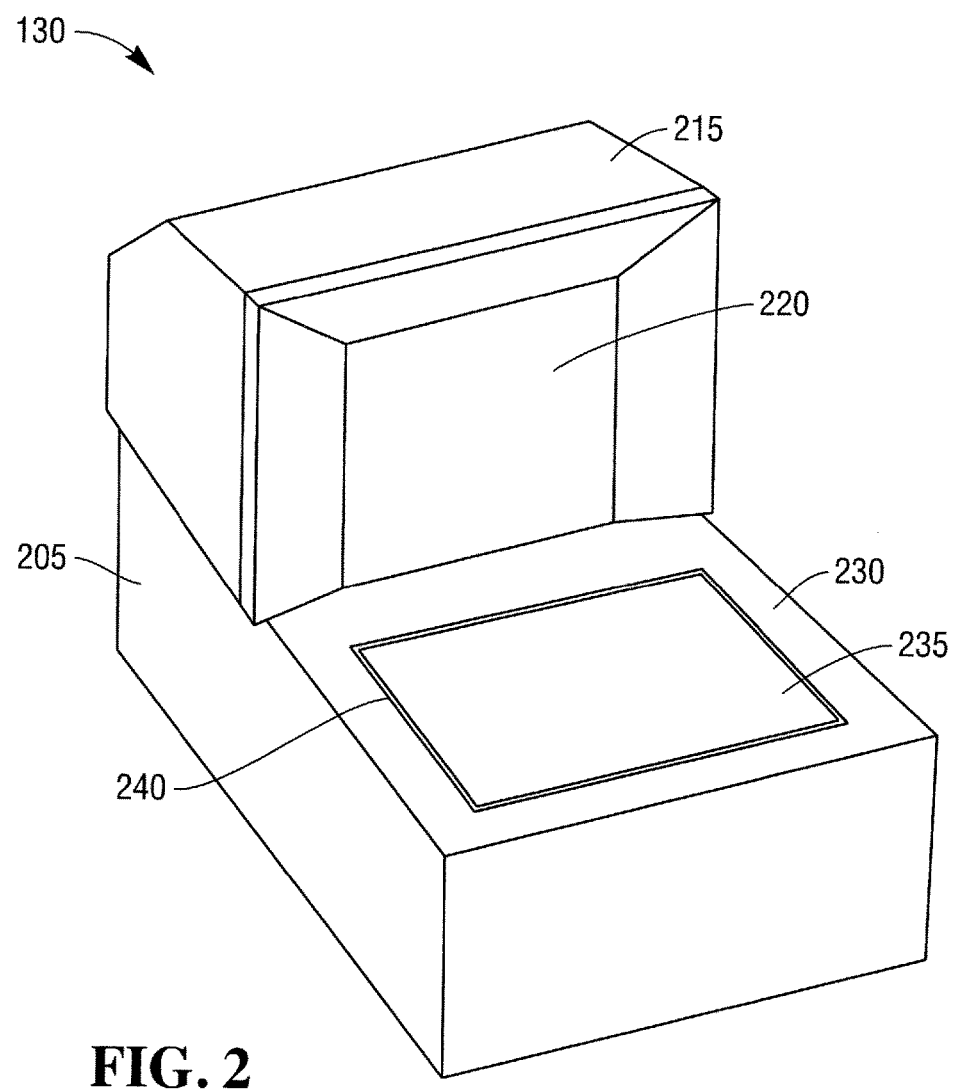
FIG. 2 is a high-level drawing illustrating an optical code scanner and weigh scale device of the present invention.

The operator display 115 displays information used by a cashier to operate the POS terminal 105. In this embodiment, the cashier is a trained operator employed to, at least in part, operate the POS terminal 105. The operator display 115 also includes a touch screen interface that receives input from the operator. The keyboard 155 is used by the cashier to input data and commands to the computer 110. In customer operated embodiments, the keyboard 155 is available for the customer to use as an input device to enter responses to requests that are made to the customer, usually on the operator display 115. The cash drawer 125 is controlled by the computer 110 and stores currency, checks, coupons and the like. In some embodiments that include a customer operated POS terminal 105, the cash drawer 125 is replaced by an automatic cash acceptor/dispenser which is controlled by the computer 110 and accepts and dispenses currency. The optical code scanner and weigh scale device 130 ("scanner/scale device") is used to read optical codes presented to the POS terminal 105 for identification. The scanner/scale device 130 also includes a weigh scale that determines the weight of an item placed on a weigh plate 240 (FIG. 2). The customer display 120 is visible to the customer and used to display information about the transaction to the customer when the POS terminal 105 is operated by a cashier.

The network controller 150 has the hardware and software necessary to support a connection to the local area network 160 and for the computer 110 to communicate over the local area network 160 to the store server 165 and other computers and POS terminals that may be connected to the network 160 or to computers on other networks connected to the local area network 160 or the store server 165.

The MSR/PIN PAD 140 reads information from a magnetic stripe usually attached to the back of a card, such as a credit/debit card, loyalty card, driver's license or the like. The PIN pad portion 140 is used to enter PIN numbers associated with a credit or debit card. The MSR/PIN Pad 140 device also includes the software and hardware needed to communicate with an external server that may suitably be used to process credit transactions. The printer 135 is used to print customer receipts and other documents related to a purchase transaction.

Referring now to FIG. 2, there is provided a high-level drawing illustrating an exemplar embodiment of the optical code scanner and weigh scale device 130 that is housed in a housing 205. The scanner/scale device 130 reads optical codes presented to the scanner/scale device 130. An optical code is a computer readable representation of information. In this embodiment, the optical code is attached to or printed on an item or object presented for purchase and includes information that identifies the item or object. The optical code may suitably include one-dimensional and two-dimensional bar codes.

The scanner/scale device 130 includes a horizontal scanning window 235 and a vertical scanning window 220. The horizontal scanning window 235 is housed in a horizontal housing component 230 of the scanner/scale device 130. The vertical scanning window 220 is housed in a vertical housing component 215 of the scanner/scale device 130. The side of the vertical housing component 215 that houses the vertical scanning window 220 is the front of the scanner/scale device 130 and faces the operator of the scanner 130. The horizontal scanning window 235 forms part of the weigh plate 240 of the weigh scale component of the scanner/scale device 130. The weigh scale component of the scanner/scale device 130 weighs items placed on the weigh plate 240.

An operator, either a cashier or a customer, scans an item by orienting an optical code on the item so it faces either the vertical scanning window 220 or the horizontal scanning window 235 and then moving the item past the windows. The scanner/scale device 130 uses imaging technology to capture an image of the optical code and decode or read it.

In some embodiments, the scanner/scale device 130 also includes laser scanning technology that uses one or more lasers to scan and read an optical code. The laser beams from the laser are directed in a scanning pattern through the vertical scanning window 220 and the horizontal scanning window 235. When one of the directed laser beams strikes and moves across an object presented to the scanner/scale device 130, the object reflects a portion of the laser light. Some of the reflected laser light passes back through one of the scanning windows (220 or 235) and is directed to a photodetector that produces electrical signal data proportional to the amount of light received. The received electrical signal data is processed to detect the presence of an optical code and to recover the information associated with the optical code.

With reference to FIG. 3, there is provided a high-level block diagram illustrating an exemplar embodiment of certain hardware components of the scanner/scale device 130. The scanner/scale device 130 includes a processor module 305 which includes a processor 310, a memory 315, and control circuitry 320. The memory 315 is non-transitory and computer readable. The memory 315 includes both volatile and non-volatile memory. The non-volatile memory may suitably include solid state and rotating memory devices. The processor 310 executes software stored in the memory 315 which causes the processor 310 to control the components of the scanner/scale device 130 and to implement the features and functions of the scanner/scale device 130.

The control circuitry 320 includes hardware that provides an interface between the processor 310 and the memory 315, and an interface between the processor 310 and a bus 340 used to communicate with other components of the scanner/scale device 130. The scanner/scale device 130 further includes a laser photo detector device 345, an image capture device 350, a weigh scale device 355, an operator interface 360 and a communications controller 365.

The laser photodetector 345 and the image capture device 350 each capture information that is used by the processor 310 to detect and read an optical code presented to the scanner/scale device 130. The information that is read from the optical code is transmitted over a network 370 to the computer 110.

The processor 310 receives information from the weigh scale device 355 that is used to determine the weight of an item placed on the weigh plate 240. The processor 310 can determine when an item is placed on the weigh plate 240 and when the item is removed from the weigh plate 240. The processor 310 also determines when the weight of the item is stable and thus accurate. Once the weight of an item is determined to be stable the processor 310 determines the weight of the item and transmits the weight over the network 370 to the computer 110. The processor 310 also implements a "zero" or "tare" function to determine the unladen weight of the weigh scale. The processor 310 will automatically subtract the unladen weight from the total weight to determine the weight of an item placed on the weigh plate 240.

The communications controller 365 includes the hardware and software required for the scanner/scale device 130 to connect to and communicate over the network 370 to computer 110. In some embodiments, the network 370 is implemented as a universal system bus (USB).

The operator interface 360 includes a speaker that produces audible sounds, associated with different functions, which are used to communicate information to the operator. The operator interface 360 may suitably include lights that are used to communicate information to the operator.

Figure 4A:
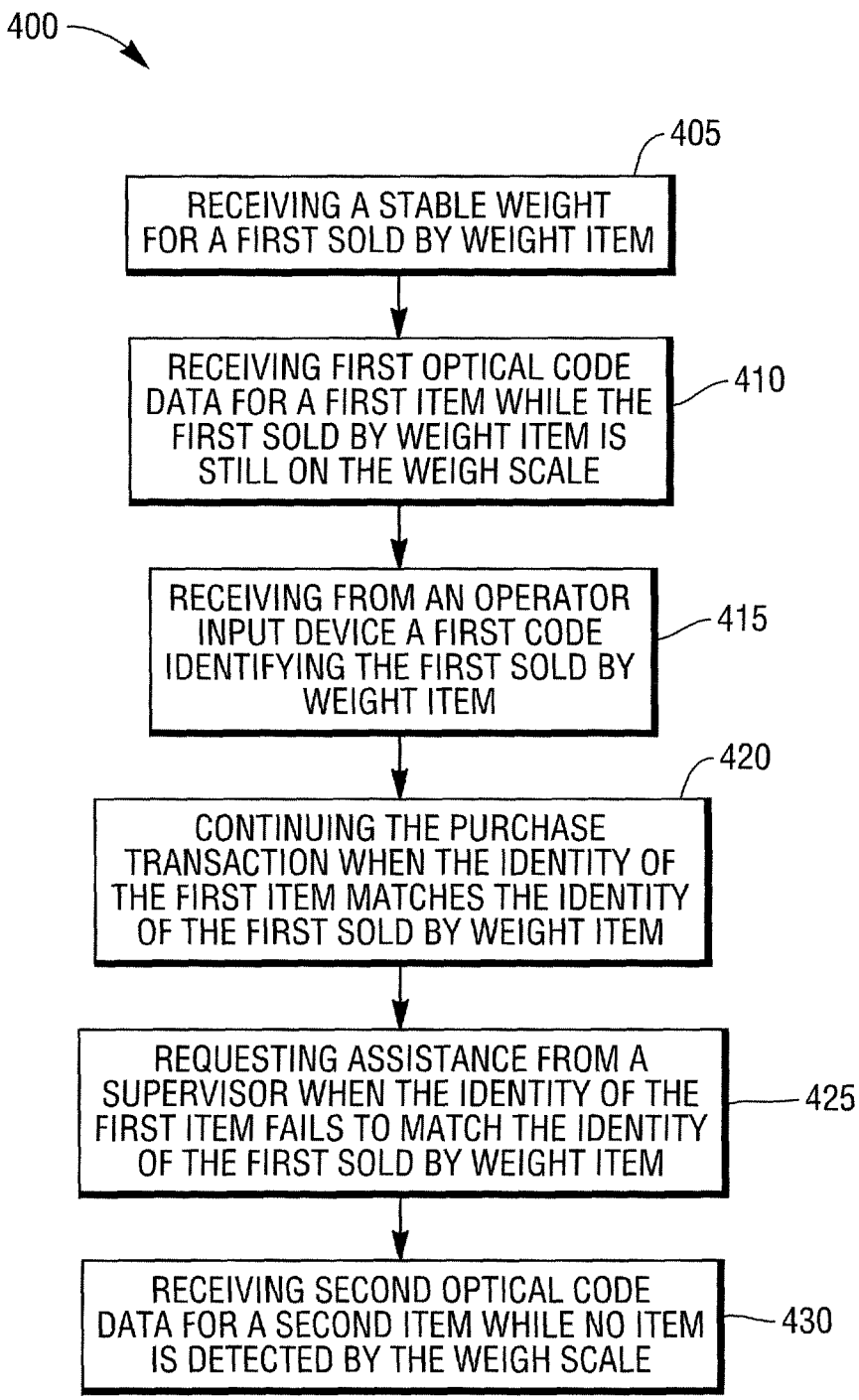
FIG. 4A is a high-level flow diagram illustrating a first method executed by the point of sale terminal for operating the optical code scanner and weigh scale device.

Turning to FIG. 4A, there is provided a high-level flow diagram illustrating a first method 400 executed by the point of sale terminal 105 for operating the optical code scanner and weigh scale device 130. The first method 400 is executed by the computer 110 in the point of sale terminal 105. The computer 110 includes a processor and memory. The memory includes computer instructions that when executed by the processor cause the computer 110 to control all the components of the point of sale terminal 105 and implement all the features and functions of the point of sale terminal 105 including performing the first method 400.

In step 405, the computer 110 receives a stable weight for a first sold by weight item that has been placed on the weigh scale portion of the scanner/scale device 130. The scanner/scale device 130 determines an item has been placed on the weigh plate 240. Once the weight has stabilized, the scanner/scale device 130 determines the weight of the item and transmits the stable weight to the computer 110. In some embodiments, the scanner/scale device 130 will notify the computer 110 when an item is first placed on the weigh plate 240 and when the item is removed. The time between the placement and removal of the item determines duration of the item weighing cycle. After the computer 110 receives the stable weight data, the computer 110 causes a message to be displayed on the operator display 115. The message requests the operator to enter a code that will identify the item that has been placed on the weigh plate 240.

In step 410, the computer 110 receives first optical code data for a first item during the weighing cycle for the first sold by weight item. Since the first optical code data is received during the item weighing cycle for the first sold by weight item, the first sold by weight item is still resting on the weigh plate 240. The computer 110 uses the first optical code data to retrieve product information about the first item. The product information includes a description of the item, type of pricing and price information. The type of pricing includes "sold by weight" where the price information is then a price per unit weight.

In step 415, the computer 110 receives a first code from an operator input device, such as the keyboard 155. The received first code is entered by the operator and identifies the item placed on the weigh plate 240. The computer 110 uses the first code to retrieve product information associated with the first code. The retrieved product information includes a description of the item and a price per unit weight.

In step 420, the computer 110 continues the purchase transaction when the identity of the first item as determined by scanning the first optical code matches the identity of the first sold by weight item as determined by the first code received from the operator input device. Continuing the purchase transaction includes calculating the price of the first sold by weight item by multiplying the received stable weight by the price per unit weight for the identified item. Information about the first sold by weight item including the calculated price is then added to the purchase transaction. A positive indication is given to the operator indicating that the item has been processed and can now be removed from the weigh plate 240. The positive indication can be an audio indication or visual indication or both.

In step 425, the computer 110 requests assistance from a supervisor when the identity of the first item as determined by scanning the first optical code does not match the identity of the first sold by weight item as determined by the first code received from the operator input device. The computer 110 transmits an alert message to a supervisor responsible for overseeing the point of sale terminal 105. The alert message includes information about the two non-matching identities and information identifying the point of sale terminal 105. After sending the alert message, the computer 110 will continue to process new items that are presented as part of the current purchase transaction. By continuing the purchase transaction, the casual operator is not made aware that the computer 110 has detected a potential fraud. When the supervisor approaches the point of sale terminal 105 to review the current purchase transaction, the operator does not know if it is a random check or the result of a request from the point of sale terminal 105. However, if the computer 110 reaches the end of the purchase transaction before the supervisor enters an identity for the first sold by weight item and authorizes the computer 110 to complete the purchase transaction, the computer 110 will halt the purchase transaction and display a notice message to the operator display with information about the delay in completing the purchase transaction.

In step 430, the computer 110 receives from the scanner/scale device 130 second optical code data for a second item while the weigh scale portion of the scanner/scale device 130 indicates that no item is present on the weigh plate 240. The computer 110 determines that no item is present on the weigh plate 240 because the weigh scale portion of the scanner/scale device 130 has not indicated that a weighing cycle has begun. The computer 110 processes the second optical code data and adds the second item to the purchase transaction.

Figure 4B:
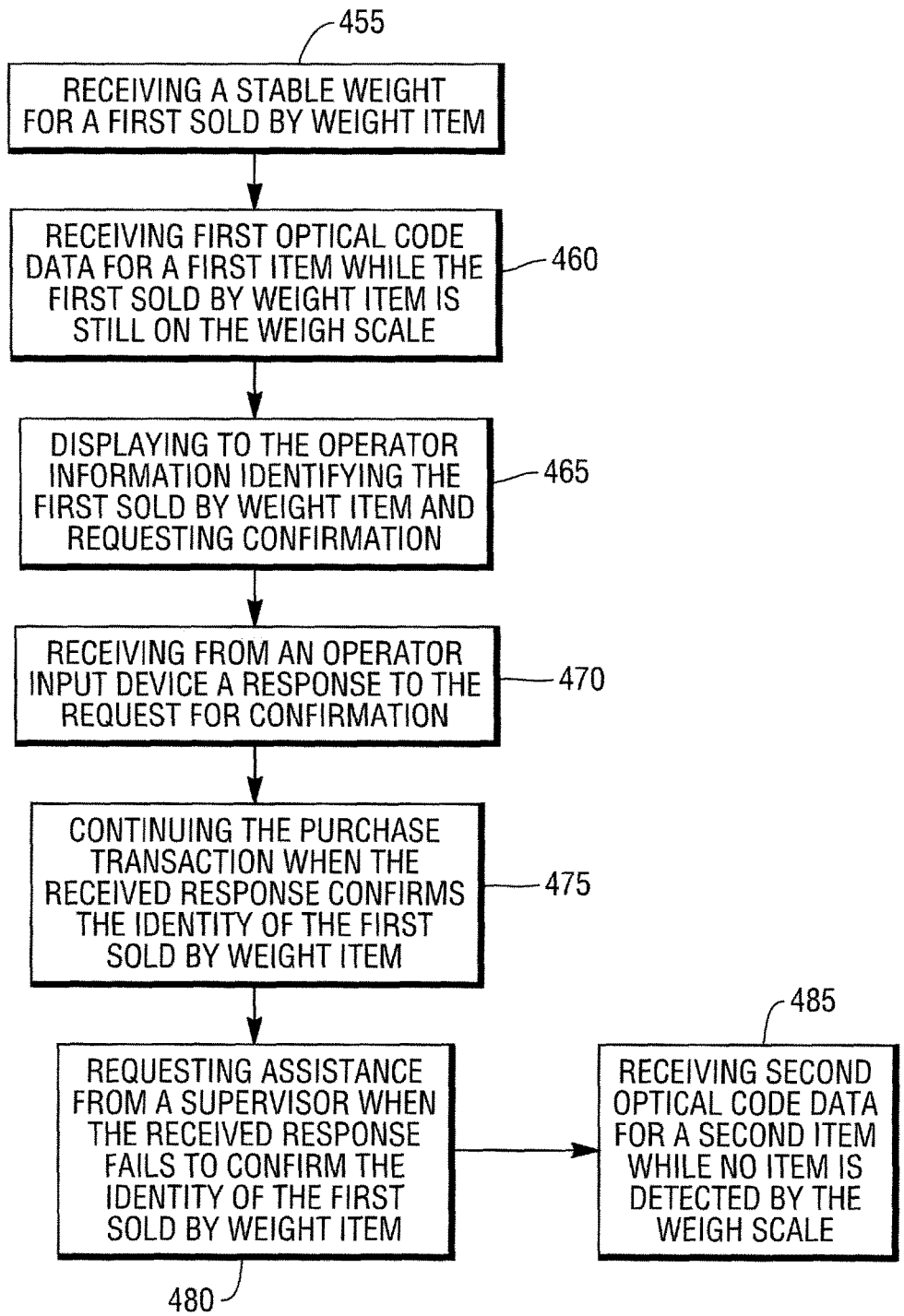
FIG. 4B is a high-level flow diagram illustrating a second method executed by the point of sale terminal for operating the optical code scanner and weigh scale device.

Turning to FIG. 4B, there is provided a high-level flow diagram illustrating a second method 450 executed by the point of sale terminal 105 for operating the optical code scanner and weigh scale device 130. The second method 450 is executed by the computer 110 in the point of sale terminal 105.

In step 455, the computer 110 receives a stable weight for a first sold by weight item that has been placed on the weigh scale portion of the scanner/scale device 130.

In step 460, the computer 110 receives first optical code data for a first item during the weighing cycle for the first sold by weight item. Since the first optical code data is received during the weighing cycle for the first sold by weight item, the first sold by weight item is still resting on the weigh plate 240. The computer 110 uses the first optical code data to retrieve product information about the first item. The product information includes a description of the item, type of pricing and price information. The type of pricing includes "sold by weight" where the price information is then a price per unit weight.

In step 465, the computer 110 displays to the operator on the operator display 115 a message that includes information identifying the first item and requests that the operator confirm that the information identifies the first sold by weight item placed on the weigh plate 240.

In step 470, the computer 110 receives from an operator input device a response to the request for confirmation from the operator. The operator can enter two possible answers to the confirmation request. A positive response indicates the displayed information identifying the first sold by weight item is correct. A negative response indicates that displayed information identifying the first sold by weight item is not correct.

In step 475, the computer 110 continues the purchase transaction when the received confirmation confirms the displayed information does identify the first sold by weight item. Continuing the purchase transaction includes calculating the price of the first sold by weight item by multiplying the received stable weight by the price per unit weight for the identified item. Information about the first sold by weight item including the calculated price is then added to the purchase transaction. A positive indication is given to the operator indicating that the item has been processed and can now be removed from the weigh plate 240. The positive indication can be an audio indication or visual indication or both.

In step 480, the computer 110 requests assistance from a supervisor when the received confirmation indicates the displayed information does not identify the first sold by weight item. The computer 110 transmits an alert message to a supervisor responsible for overseeing the point of sale terminal 105. The alert message includes information about the negative confirmation from the operator and information identifying the point of sale terminal 105. After sending the alert message, the computer 110 will continue to process new items that are presented as part of the current purchase transaction. By continuing the purchase transaction, the casual operator is not made aware that the computer 110 has detected a potential fraud. When the supervisor approaches the point of sale terminal 105 to review the current purchase transaction, the operator does not know if it is a random check or the result of a request from the point of sale terminal 105. However, if the computer 110 reaches the end of the purchase transaction before the supervisor enters an identity for the first sold by weight item and authorizes the computer 110 to complete the purchase transaction, the computer 110 will halt the purchase transaction and display a notice message to the operator display with information about the delay in completing the purchase transaction.

In step 485, the computer 110 receives from the scanner/scale device 130 second optical code data for a second item while the weigh scale portion of the scanner/scale device 130 indicates that no item is present on the weigh plate 240.

The computer 110 determines that no item is present on the weigh plate 240 because the weigh scale portion of the scanner/scale device 130 has not indicated that a weighing cycle has begun. The computer 110 processes the second optical code data and adds the second item to the purchase transaction.

Although the present invention has been described with particular reference to certain preferred embodiments thereof, variations and modifications of the present invention can be effected within the spirit and scope of the following claims.

What is claimed is:

1. A computer implemented method for processing a purchase transaction performed by a point of sale terminal, the method comprising:
    weighing a first item while on a weigh scale portion of an optical scanner and weigh scale device during a weighing cycle of the optical scanner and weigh scale device and receiving stable weight data for the first item;
    while the first item remains on the optical scanner and the optical scanner and weigh scale device remains in the weighing cycle performing scanning of the first item and receiving a first optical code that is located on the first item;
    receiving, during the weighing cycle and from an operator input device, a first code identifying the first item while the first item remains on the weigh scale portion of the optical code scanner and weigh scale device;
    continuing the purchase transaction when the identity of the first item as determined by the first optical code data matches the identity of the first item as determined by the first code, and wherein the weighing cycle includes a time between placement and removal of the first item on the optical scanner and weigh scale device; and
    requesting assistance from a supervisor when the identity of the first item as determined by the first optical code data fails to match the identity of the first item as determined by the first code.

2. The method of claim 1, further comprising:
    determining the identity of the first item using the first optical code data; and
    determining the identity of the first item using the received first code.

3. The method of claim 2, wherein determining the identity of a first item using the first optical code data further includes searching a product information database using the first optical code data as a key to access the identity of the first item.

4. The method of claim 2, wherein determining the identity of a first item using the first optical data further includes determining a price per unit weight for the item.

5. The method of claim 4, wherein continuing the purchase transaction further includes:
    calculating the price of the first item by multiplying the price per unit weight for the first item by the receiving stable weight data for the first item; and
    adding to the purchase transaction information identifying the first item, the weight of the first item and the calculated price of the first item.

6. The method of claim 1, further comprising:
    receiving second optical code data from an optical code scanner and weigh scale device wherein the second optical code data includes information identifying a second optical code that was moved past the optical code scanner and weigh scale device for identification; and
    processing the second optical code as part of the purchase transaction.

7. The method of claim 1, wherein requesting assistance from a supervisor further comprises halting the purchase transaction prior to completing the purchase transaction if input from a supervisor is not received that resolves the identity of the first item.

8. The method of claim 1, wherein the point of sale terminal is a self-service point of sale terminal.

9. A computer implemented method for processing a purchase transaction performed by a point of sale terminal, the method comprising:
    weighing and scanning a first item during a weighing cycle during which the first item is being weighed for stable weight data and while the first item is on a weigh scale portion of an optical scanner and weigh scale device and receiving, during the weighing cycle, both the stable weight data and an optical scan of first optical code data for the first item, and wherein the weighing cycle includes a time between placement and removal of the first item on the optical scanner and weigh scale device,
    wherein the stable weight data includes a stable weight for the first item placed on the weigh scale portion of the optical code scanner and weigh scale device, and;
    wherein the first optical code data includes information identifying a first optical code that is located on the first item;
    determining the identity of a first item using the first optical code data;
    displaying on an operator display device information identifying the first item and requesting confirmation that this information identifies the first item;
    receiving from an operator input device a response to the confirmation request;
    continuing the purchase transaction when the received response confirms the identity of the first item; and
    requesting assistance from a supervisor when the received response fails to confirm the identity of the first item.

10. The method of claim 9, further comprising:
    determining the identity of a first item using the first optical code data.

11. The method of claim 10, wherein determining the identity of a first item using the first optical code data further includes searching a product information database using the first optical code data as a key to access the identity of the first item.

12. The method of claim 10, wherein determining the identity of a first item using the first optical data further includes determining a price per unit weight for the item.

13. The method of claim 12, wherein continuing the purchase transaction further includes:
    calculating the price of the first item by multiplying the price per unit weight for the first item by the receiving stable weight data for the first item; and
    adding to the purchase transaction information identifying the first item, the weight of the first item and the calculated price of the first item.

14. The method of claim 9, further comprising:
    receiving second optical code data from an optical code scanner and weigh scale device wherein the second optical code data includes information identifying a second optical code that was moved past the optical code scanner and weigh scale device for identification; and
    processing the second optical code as part of the purchase transaction.

15. The method of claim 9, wherein requesting assistance from a supervisor further comprises halting the purchase transaction prior to completing the purchase transaction if input from a supervisor is not received that resolves the identity of the first item.

16. The method of claim 9, wherein the point of sale terminal is a self-service point of sale terminal.

17. A point of sale terminal comprising:
an optical code scanner and weigh scale device configured to read optical codes presented to the device while the optical code scanner determines a weight of items placed on a weigh plate during a weighing cycle, wherein the weighing cycle includes a time between placement and removal of the items on the optical code scanner and weigh scale device;
an operator display device configured to display information to an operator of the point of sale terminal;
an operator input device configured to receive information from the operator;
a memory including computer instructions and computer data;
a processor in communication with the optical code scanner and weigh scale device, the operator display device, the operator input device and the memory, the processor configured to execute the computer instructions which when executed cause the processor to perform the following steps:
weigh and scan, during the weighing cycle, a first item placed on a weigh scale portion of the optical code scanner and weight scale device and receive both stable weight data and an optical scan of first optical code data for the first item when the weighing cycle ends indicating that the first item has been removed from the weigh scale portion, wherein the stable weight data includes a stable weight for the first item placed on the weigh scale portion of the optical code scanner and weigh scale device, and;
wherein the first optical code data includes information identifying a first optical code that is located on the first item;
receive from the operator input device a first code identifying the first item resting on the weigh scale portion of the optical code scanner and weigh scale device;
continuing the purchase transaction when the identity of the first item as determined by the first optical code data matches the identity of the first item as determined by the first code; and
requesting assistance from a supervisor when the identity of the first item as determined by the first optical code data fails to match the identity of the first item as determined by the first code.

18. The method of claim 17, wherein the processor further performs the following steps:
in response to receiving the stable weight data, display on the operator display device a request to enter a code identifying the first item placed on the weigh scale;
determine the identity of a first item using the received first optical code data; and
determine the identity of the first item using the received first code.

19. The method of claim 17, wherein the processor further performs the following steps:
receiving second optical code data from an optical code scanner and weigh scale device wherein the second optical code data includes information identifying a second optical code that was moved past the optical code scanner and weigh scale device for identification; and
processing the second optical code as part of the purchase transaction.

20. The method of claim 17, wherein requesting assistance from a supervisor further comprises halting the purchase transaction prior to completing the purchase transaction if input from a supervisor is not received that resolves the identity of the first item.

* * * * *